(12) United States Patent
Shelton et al.

(10) Patent No.: US 7,755,294 B2
(45) Date of Patent: Jul. 13, 2010

(54) VEHICLE HEADLIGHT BEAM CONTROLS

(75) Inventors: Richard Dennis Shelton, Coventry (GB); Peter Howard Betts, Congleton (GB); David Philip Smith, Kineton (GB)

(73) Assignee: Jaguar Cars Limited, Coventry (GB)

( * ) Notice: Subject to any disclaimer, the term of this patent is extended or adjusted under 35 U.S.C. 154(b) by 329 days.

(21) Appl. No.: 12/062,983

(22) Filed: Apr. 4, 2008

(65) Prior Publication Data
US 2008/0246404 A1 Oct. 9, 2008

(30) Foreign Application Priority Data
Apr. 5, 2007 (GB) .................................. 0706704.4

(51) Int. Cl.
*H05B 37/02* (2006.01)
(52) U.S. Cl. ...................... 315/80; 315/82; 315/156; 315/159; 307/10.8
(58) Field of Classification Search ............ 315/82, 315/76, 83, 80, 77, 149, 150, 155, 156, 158, 315/159; 307/10.8
See application file for complete search history.

(56) References Cited

U.S. PATENT DOCUMENTS

| | | | | |
|---|---|---|---|---|
| 4,899,083 | A | * | 2/1990 | Kataoka et al. ............... 315/77 |
| 5,998,929 | A | * | 12/1999 | Bechtel et al. ................ 315/82 |
| 6,711,481 | B1 | | 3/2004 | King et al. |
| 6,947,576 | B2 | | 9/2005 | Stam et al. |

FOREIGN PATENT DOCUMENTS

| | | |
|---|---|---|
| EP | 1316475 A2 | 6/2003 |
| WO | WO 01/70538 | 9/2001 |
| WO | WO 2006/084536 | 8/2006 |
| WO | WO 2007/019954 | 2/2007 |

OTHER PUBLICATIONS

European Office Action for corresponding Application No. 08 200 008.4, 9 pages, May 13, 2009.

* cited by examiner

*Primary Examiner*—David Hung Vu
(74) *Attorney, Agent, or Firm*—Brooks Kushman P.C.

(57) ABSTRACT

A method of manually overriding automatic activation of an automatic headlight control system for a motor vehicle, headlamps operable in a high beam state and a low beam state, a high/low beam switch movable from a neutral position to a latched position and from a neutral position to a non-latched position for controlling the state of the headlamps and a headlamp on/off switch comprising a multi-position switch with at least a selectively automatic headlamp position is disclosed. The system includes forward-facing sensor for collecting light emanating from for instance a second vehicle, and a controller for controlling, when the headlamp switch is detected as being in the automatic headlamp position, the headlamp states as a function of the sensed intensity of the beam of light emanating from said second vehicle. The method comprises the steps of: monitoring the states of the headlamps when the headlamp on/off switch is in the automatic position, causing the controller to initiate an override mode if the high beam states is detected (step 230) and said high/low beam switch is detected as moved from the neutral position to the non-latched position whereupon the controller changes the headlamps to the Low state (step 260) when the High/Low beam switch is subsequently released to the neutral position. Such a method ensures the use of conventional stalk.

18 Claims, 2 Drawing Sheets

VEHICLE HEADLIGHT BEAM CONTROLS

Figure 1:
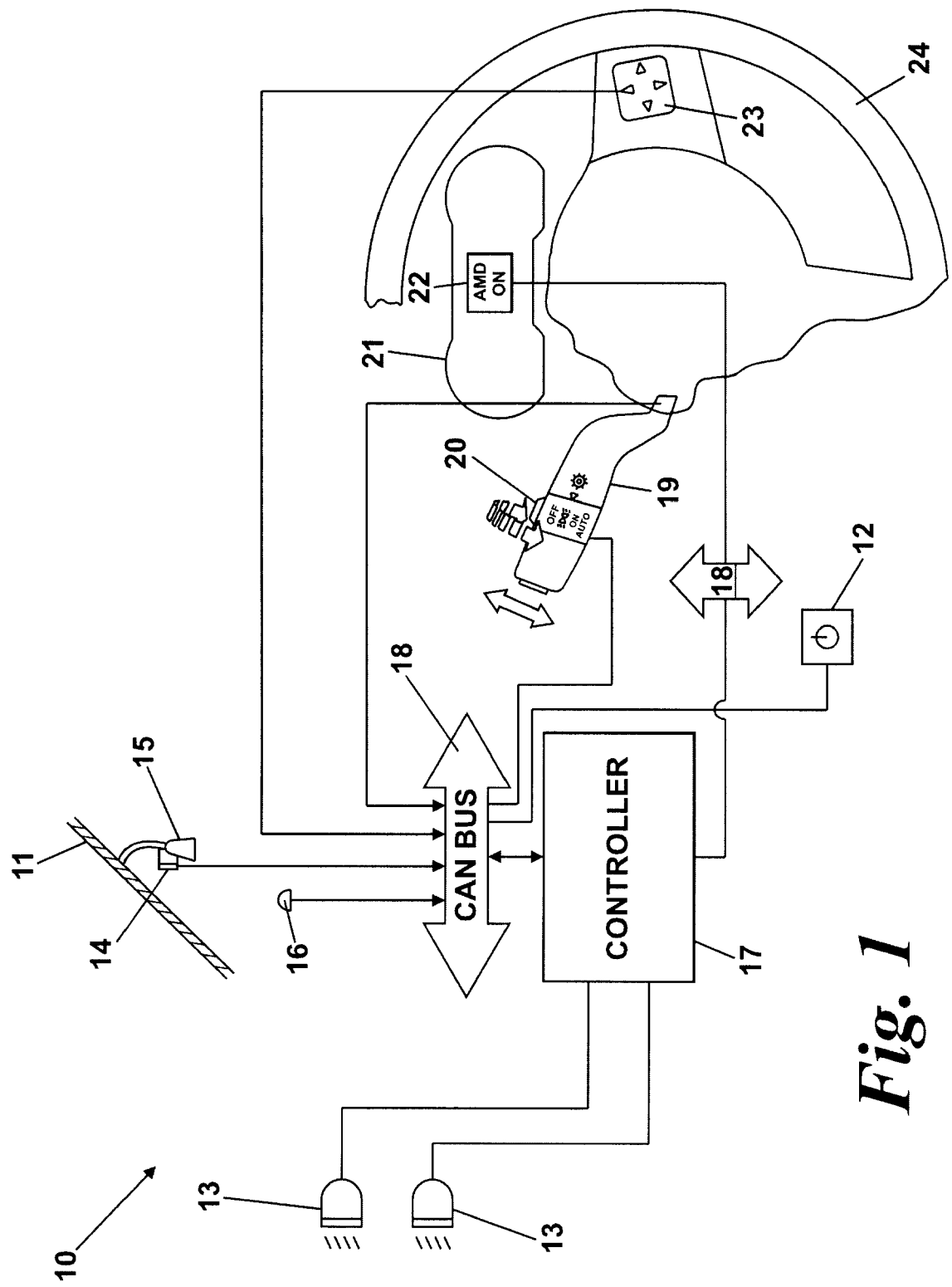

The present invention relates to a method for manually overriding automatic activation of an automatic headlight beam control system for a motor vehicle.

Automatic headlight beam control systems are known. These sense the headlamps of oncoming vehicles as well as the tail lamps of vehicles travelling ahead and respond by automatically dipping or dimming the headlamps. Such an automatic headlight control system includes a forward-facing sensor, e.g. mounted in a mirror mount, for collecting light emanating from a second vehicle, a light sensor for collecting ambient light and a controller for controlling on the one hand the state of the beams of the headlamps as a function of the sensed intensity of the light emanating from said second vehicle and on the other hand the electrical energization of the headlamps as a function of the sensed ambient light. The controller is coupled by a standard network bus to a high/low beam switch and to a headlamp on/off switch. In certain circumstances, it may be necessary for the driver to override easily and quickly the automatic headlamp control. This may be the case when the driver wants to pass a pedestrian or a cyclist on the edge of the road without dazzling him/her or in another situation, for instance when the driver wants to drive through a village with the high beams on (i.e. to temporary force a high beam state). To achieve this, it is known for instance from U.S. Pat. No. 6,947,576 to override the automatic mode by manually operating the high/low beam switch and using timers to automatically revert to automatic mode. One disadvantage of such a method is that the system will revert to the automatic mode at the end of a predetermined period which may overlook the driver's wishes. Furthermore, such a method requires the use of a high/low beam switch which is able to move back to a neutral position after actuation by the user so that there is no conflict between the state of the high/low beam switch and the state which is selected by the control system.

It is an object of this invention to provide an improved method of overriding automatic activation of an automatic headlight control system for a motor vehicle using a high/low beam switch which may be latched in at least one position.

According to a first aspect of the invention there is provided a method of manually overriding automatic activation of an automatic headlight control system for a motor vehicle having headlamps operable in a high beam state and a low beam state, a high/low beam switch for controlling the state of the headlamps and a headlamp on/off switch comprising a multi-position switch with at least a selectable automatic headlamp position, the system including a forward-facing sensor for collecting light emanating from a light source in front of the vehicle, an ambient light sensor for collecting ambient light and a controller for controlling, when the headlamp switch is detected as being in the automatic headlamp position, the headlamp state as a function of the sensed intensity of the beam of light source, the high/low beam switch being movable in one direction from a neutral low beam position to a latched high beam position and in another direction from the neutral position to a non-latched high flash position; said method comprising the steps of: monitoring the states of the headlamps when the headlamp on/off switch is in its automatic position, causing the controller to initiate an override mode if the high beam state is detected and said high/low beam switch is detected as moved from the neutral position to the non-latched position whereupon the controller changes the headlamps to the low state when the high/low beam switch is subsequently released to the neutral position.

Preferably, the automatic mode is resumed when the controller has monitored that the high/low beam switch has been moved sequentially to the latched position and then to the neutral position.

The high/low beam switch may be a stalk switch mounted on a steering column. The headlamp on/off switch may be integrated into the stalk switch and may take the form of a rotatable switch disposed on the stalk switch.

The headlamp on/off switch may also include a selectable Off position and an exit delay position, wherein when the exit delay position is selected, the controller operates the system in the automatic mode.

The vehicle may have an instrument cluster including a display which is coupled to the controller by a standard network bus and to a user interface, the controller, when the headlamp switch is detected as being in the automatic position, being also arranged to turn on or off the headlamp as a function of the sensed ambient light, in which the control of the headlamp states as a function of the sensed intensity of the light source by the controller can be disabled through the user interface.

Figure 2:
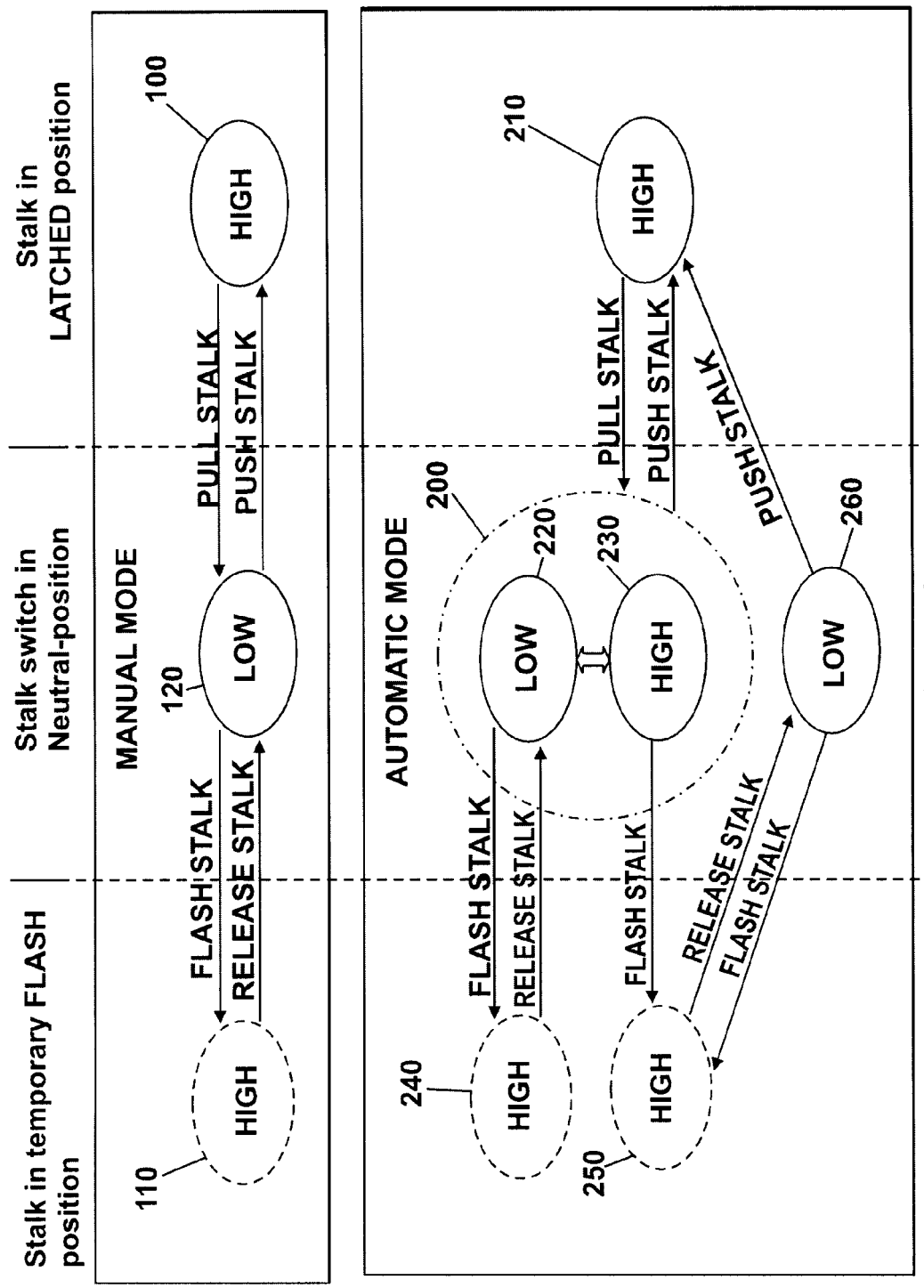

The forward-facing sensor may be capable of being adjusted to the side of the road the vehicle is moving via selection of the left or right side from the instrument cluster via the user interface The invention will now be described by way of example with reference to the accompanying drawings of which:

FIG. 1 is a schematic block diagram of an automatic headlight dimming system for a vehicle in accordance with the present invention, and FIG. 2 is a state diagram illustrating a method for manually or automatically controlling the vehicle headlamps in response to activation of various manual switches in accordance with the present invention.

Referring now to FIG. 1, there is shown an automatic headlight dimming system 10 for a vehicle (only shown by the windscreen 11) including, in a conventional manner, an ignition switch 12 and headlamps 13 having a high beam state and a low beam state. The system 10 includes a forward-facing sensor 14, mounted in a mirror mount 15, for collecting light emanating from a light source in front of the vehicle, particularly a second vehicle. The system also includes an ambient light sensor 16 for collecting ambient light and a controller 17 for controlling, on the one hand, the electrical energization of the headlamps 13 as a function of the sensed ambient light and, on the other hand, the state of the headlamp beams as a function of the sensed intensity the light source, e.g. the headlamps of the second vehicle. It will be appreciated that the sensors 14, 16 may be as described in U.S. Pat. No. 6,947,756 which is incorporated herein by reference and will not be further described.

The controller 17 is coupled by a standard network bus, e.g. a CAN Bus 18 to the sensors 14, 16, the headlamps 13, the ignition switch 12, a high/low beam switch 19 mounted to a steering column and to a headlamp on/off switch 20.

In this example the high/low beam switch is a stalk switch 19 having three positions: a neutral position in which the high beams are OFF, a non-stable or flash high position in which, in this example, the switch is pulled towards the steering wheel from the neutral position so as to cause the High beam to flash on and off and a stable or latched High Beam position in which the switch, from the neutral position, can be pushed away from the steering wheel so as to switch the High beam ON when the ignition switch 12 is ON. The on/off switch 20 is integrated into the column stalk switch 19 and is a rotatable "multi-position" electrical switch, in this example a rotary collar 20 having four positions: namely an OFF position, a Side lights position, a Headlamps manual mode position and a Headlamps automatic mode position respectively.

In a conventional manner, the vehicle includes an instrument cluster 21 for communicating information to a driver. The instrument cluster 21 includes a display 22 which is coupled to the controller 17 via the CAN bus 18 and to a user interface, e.g. menu navigation buttons 23 mounted on the steering wheel 24 which allow for monitoring and controlling vehicle functions such as, for example, setting the language of warning messages or setting the clock . . . .

The controller 17 includes microprocessors and a conventional memory which is adapted to store the logic control of the system 10 which directs the operation of headlamps 13.

In operation, referring to FIG. 2, when the rotary collar 20 is turned to the Headlamps "manual mode" position, the user is able to change the state of the headlamps by moving the stalk switch 19 to its latched position in order to select the high beam state (step 100). Similarly the stalk switch 19 can be moved to its non-stable flash high position in order to quickly switch the headlamps from Low to High beam (step 110) and back to Low beam state (step 120) when the stalk switch 19 is released.

When the rotary collar 20 is turned to the "automatic mode" position with the ignition switch 12 switched on, it sends a signal to the controller 17, effective to enable the automatic headlamp function or mode of the system 10. When the system 10 is operating in the automatic headlamp mode, the headlamps 13 are turned "on" and "off" automatically based upon the level of ambient light outside of the vehicle as determined by the ambient light sensor 16. The system 10 also provides automatic switching of the headlamps 13 (at step 200) between the low beam state (step 220) and the high beam state (step 230) based upon a detection that the vehicle is moving (information available from the CAN bus 18) that the stalk switch 19 is in the neutral (low beam) position and the level of light detected by the forward-facing sensor 19.

If the stalk switch 19 is moved by the driver to its High beam position, i.e the latched position, the controller 17 disables the automatic mode and the high beams of the headlamps are turned "on", at step 210.

The present invention allows a user to specifically override automatic activation of the automatic headlight control system 10 using only the latchable stalk switch 19.

As shown in FIG. 2, the user can override the automatic mode with the collar switch 20 in the auto mode position by moving the stalk switch 19 towards its non-stable position or temporary flash position. The controller 17 continuously monitors the state of the headlamps 13 and the positions of the stalk switch 19 and, depending on the state of the headlamps 13 (steps 220 or 230), overrides the automatic mode.

If the headlamps 13 are detected in Low state (step 220) and the user moves the stalk switch 19 into the flash position, the controller 17 changes the state of the beam of the headlamps 13 to High beam (step 240) until the user releases the stalk switch 19 where upon the controller allow the system to resume automatic operation (step 200).

If, on the other hand, the headlamps 13 are detected in High state (step 230) and the user moves the stalk switch 19 into the flash position, the controller 17 maintains the state of the beam of the headlamps 13 at their High state (step 250). However, when the user releases the stalk switch 19, i.e. back to the neutral position, the controller 17 modifies the state of the beam of the headlamps 13 to Low beam (step 260), overriding the automatic mode.

From this position (step 260), if the user moves the stalk switch 19 back into the flash position, the controller 17 changes the state of the headlamps 13 to High Beam (step 250) until the user releases the stalk switch 19. However if the user moves the stalk switch 19 to its latched position, the controller 19 changes the states of the beam of the headlamps 13 from Low beam to High beam (step 210). From this latter position (step 210), when the user move the stalk switch 19 back to its neutral position, the override mode will be cancelled, i.e. automatic mode is activated (step 200) and the controller will change the state of the headlamps 13 according to the information received from the sensors 14, 16 and the switch 12.

The controller also enables an override mode of the automatic control when the stalk switch is moved towards its latched position (step 210) where the headlamps 13 are switched to High beam state.

It will be appreciated that the driver is notified that the system is in automatic mode by switching on a warning light having the word "AUTO" or a suitable graphic. Similarly, the driver will be notified that an override of the automatic mode is currently in operation since the warning light symbol with the word "AUTO" or graphic will be switched off.

The present invention allows a user to intuitively override and resume the automatic mode using familiar operational movements of the conventional stalk switch or other headlamp control and without the frustration that can be felt if a timer is used.

In an alternative, the user can disable the automatic headlight control by deselecting the automatic dipping using the menu navigation buttons 23 on the steering wheel 24 on the instrument cluster 21. This de-selection automatic dipping function enables the user to have the sidelights and headlamps automatically turned "on" when the rotary collar 20 is in the auto mode position. The controller 17 detects that the level of ambient light measured by the light sensor 16 falls below a predetermined threshold to switch the lights on but the control of the beam of the headlamp is left to the user by operation of the stalk switch 19 in the conventional manner, i.e. as in step 100, 110 and 120.

In another alternative, the user can through the same instrument cluster 21 adjust the operation of the forward-facing sensor 14 to whichever side of the road the vehicle is being driven, i.e. left or right, by selecting Left or Right side on the menu provided on the display 22. This helps to avoid unwanted errors by ensuring that the forward facing sensor 14 is sensitive to the lights of oncoming traffic.

Although the above example describes a headlamp on/off switch 20 integrated into the stalk switch 19, it will be appreciated that the headlamp on/off switch 20 may be separated from the stalk switch 19 and have the form, for instance, of a selectively rotatable switch disposed on the dashboard or near the instrument panel. Furthermore, if the headlamp on/off switch 20 includes a programmed exit delay position (i.e. by which the driver can select a time period where the Headlights will remain on after the driver's door has closed) the control of the automatic headlight dipping system 10 when the headlamp on/off switch 20 is in the exit delay position can be identical to the method described above when the on/off switch 20 is positioned in the auto mode.

The invention claimed is:

1. A method of manually overriding automatic activation of an automatic headlight control system for a motor vehicle having headlamps operable in a high beam state and a low beam state, a high/low beam switch for controlling the state of the headlamps and a headlamp on/off switch comprising a multi-position switch with at least a selectable automatic headlamp position, the system including a forward-facing sensor for collecting light emanating from a light source in front of the vehicle, an ambient light sensor for collecting ambient light and a controller for controlling, when the headlamp switch is detected as being in the automatic headlamp position, the headlamp state as a function of the sensed intensity of the beam of light source, the high/low beam switch being movable in one direction from a neutral low beam position to a latched high beam position and in another direction from the neutral position to anon-latched high flash position; the method comprising:

monitoring the states of the headlamps when the headlamp on/off switch is in its automatic position;

causing the controller to change from the automatic mode to an override mode if the high beam state is detected and the high/low beam switch is detected as moved from the neutral position to the non-latched position whereupon the controller changes the headlamps to the low state when the high/low beam switch is subsequently released to the neutral position;

causing the controller to temporarily change from the automatic mode to the override mode if the low beam state is detected and the high/low beam switch is detected as moved from the neutral position to the non-latched position whereupon the controller changes the headlamps to the high state temporarily while the high/low beam switch is in the non-latched position and thereafter changes the headlamps back to the low state when the high/low beam switch is subsequently released to the neutral position, the controller changing back from the override mode to the automatic mode with the changing of the headlamps back to the low state.

2. A method as claimed in claim 1 wherein the automatic mode of the system is resumed, after the controller changes to the override mode, when the controller has monitored that the high/low beam switch has been moved sequentially to the latched position and then to the neutral position.

3. A method as claimed in claim 1 in which the high/low beam switch is a stalk switch mounted on a steering column.

4. A method as claimed in claim 3 in which the headlamp on/off switch is integrated into the stalk switch.

5. A method as claimed in claim 4 in which the headlamp on/off switch is a rotatable switch disposed on the stalk switch.

6. A method as claimed in claim 1 in which the headlamp on/off switch also includes a selectable Off position and an exit delay position, wherein, when the exit delay position is selected, the controller operates the system in the automatic mode.

7. A method as claimed in claim 1, the vehicle having an instrument cluster including a display which is coupled to the controller by a standard network bus and to a user interface, the controller, when the headlamp switch is detected as being in the automatic position, being also arranged to turn on or off the headlamp as a function of the sensed ambient light, in which the control of the headlamp states as a function of the sensed intensity of the light source by the controller can be disabled through the user interface.

8. A method as claimed in claim 7, in which the forward-facing sensor is capable of being adjusted to the side of the road the vehicle is moving via selection of the left or right side from the instrument cluster via the user interface.

9. A method as claimed in claim 2 wherein the controller remains in the override mode, after changing to the override mode in claim 1, when the controller has monitored that the high/low beam switch has been moved sequentially to the non-latched position and then released to the neutral position.

10. A method as claim in claim 9 wherein the controller changes the headlamps from the low state to the high stage for at least a portion of a period taken to move the high/low beam switch between the neutral and non-latched positions of claim 9.

11. A method as claimed in claim 2 wherein the controller changes the headlamps from the low state to the high state for at least a portion of a period taken to move the high/low beam switch between the neutral and latched positions.

12. A controller switching between manual and automatic control of a vehicle headlamp between at least a first and second state of illumination comprising:

the controller transitioning from automatic control to manual control when (1) the switch is moved from a first position to a second position while the headlamp is in the second state; (2) when the switch is moved from the first position to a third position while the headlamp is in the first state; and (3) when the switch is moved from the first position to the third position while the headlamp is in the second state;

the controller continuing to operate according to the manual control when transitioned due to (1), (2), or (3) until the switch is moved from the first position to the third position and then back to the first position whereupon the controller returns to operate according to the automatic control; and the controller temporarily transitioning from the automatic control to the manual control in so far as the controller temporarily overrides the automatic control dictating control of the headlamp to be in the first state to instead be in the second state for a temporary period of time corresponding with the switch being retained in the second position whereupon the controller immediately transitions back to the automatic control once the switch returns to the first position.

13. The controller of claim 12 wherein the switch must be moved to the first position before the switch can be moved to either one of the second and third positions.

14. The controller of claim 12 wherein the headlamp is switched from a current state of being in either the first state and the state when the transition from the automatic control to the manual control results from (1) and (2) but not (3).

15. A method of switching between manual and automatic control of a vehicle headlamp, wherein the manual control is characterized by a controller relying on user inputs to switch the headlamp between high and low states and the automatic control is characterized by the controller relying on sensed inputs to switch the headlamp between the high and low states, wherein the controller detects the user inputs from movements of a switch between a neutral position and either one of a latched position and a non-latched position, the latch position characterized by the switch remaining in the latched position in the absence of user force moving the switch back from the latched position to the neutral portion, the non-latched position characterized by the switch remaining in the latched position as long as user force retains the switch in the non-latched position against force applied by an element that otherwise forces return of the switch to the neutral position, the method comprising:

operating the controller in a first state, the first state characterized as the controller according to the automatic control to control the headlamp to be in one of the high state or the low state depending on the sensed inputs;

while operating in the first state with the headlamp in the low state, the controller transitioning to operate in a second state upon movement of the switch from the neutral position to the non-latched position, the second state characterized as a temporarily override of the automatic control in that the headlamp is changed from the low state to the high state while the automatic mode dictates controlling the headlamp to be in the low state;

while operating in the second state, the controller returning back to operate in the first state upon movement of the switch back to the neutral position from the non-latched position of the second state, the return characterized as the controller ceasing to override the automatic mode and the controller returning the headlamp to the low or high state dictated by the automatic mode;

while operating in the first state, the controller transitioning to operate in a third state when (1) the switch is moved from the neutral position to the non-latched position while the headlamp is in the high state and (2) when the switch is moved from the neutral position to the latched position while the headlamp is in either one of the high state and the low state, the third state characterized as the controller changing from the automatic control to the manual control;

while operating in the third state, the controller transitioning to operate in the first state when, in the case of (1), the switch is moved from the neutral position to the latched position and then back to the neutral position, and when, in the case of (2), the switch is moved from the latched position to the neutral position.

16. The method of claim 12 further comprising the controller, while operating within the third state, changing the headlamp to be in the high state whenever the switch is moved from the neutral position to the non-latched position while the headlamp is in the low state, and thereafter, changing the headlamp to be in the low state as soon as the switch is no longer retained in the non-latched position.

17. The method of claim 13 further comprising the controller, while operating within the third state, in the following sequential order, changing the headlamp to be in the high state whenever the switch is moved from the neutral position to the latched position while the headlamp is in the low state, and thereafter, transitioning to operate according to the first state when the switch is moved back from the latched position to the neutral position.

18. The method of claim 12 further comprising the controller controlling the headlamp to be in the high state during the second operating state only for a period corresponding with retention of the switch in the non-latched position.

* * * * *